United States Patent [19]

Critel

[11] Patent Number: 5,681,141
[45] Date of Patent: Oct. 28, 1997

[54] TIRE STACKER

[76] Inventor: Dexter L. Critel, 661 S. Lincoln, West Point, Nebr. 68788

[21] Appl. No.: 631,103

[22] Filed: Apr. 12, 1996

[51] Int. Cl.$^6$ .......................... B65G 57/28; B65H 15/00
[52] U.S. Cl. .................. 414/789.02; 414/788.5; 414/743; 414/778; 414/910
[58] Field of Search .................. 414/788.5, 789.2, 414/743, 778, 910, 911, 27

[56] References Cited

U.S. PATENT DOCUMENTS

| | | | |
|---|---|---|---|
| 2,928,540 | 3/1960 | Cunningham | 414/910 |
| 4,023,690 | 5/1977 | Goode | 414/911 |
| 4,039,365 | 8/1977 | Takasuga et al. | 414/910 |
| 4,105,486 | 8/1978 | Cantarutti | 414/910 |
| 4,293,264 | 10/1981 | Gilts et al. | 414/789.2 |
| 4,306,826 | 12/1981 | Detwiler | 414/910 |
| 4,370,796 | 2/1983 | Wilson | 414/789.2 |
| 5,211,345 | 5/1993 | Siebenga | 414/789.2 |
| 5,340,260 | 8/1994 | Turra et al. | 414/911 |
| 5,480,277 | 1/1996 | Minz | 414/911 |
| 5,562,401 | 10/1996 | Drew et al. | 414/778 |

FOREIGN PATENT DOCUMENTS 5039128  2/1993  Japan .......................... 414/910

*Primary Examiner*—Karen B. Merritt
*Assistant Examiner*—Douglas Hess

[57] ABSTRACT

A tire stacking apparatus includes a base frame with a carriage pivotally mounted on the frame for selective movement between a horizontal loading position and a vertical stacking position. The carriage includes a pair of parallel support members connected to a rotatable axle, and a pair of legs connected to the axle generally perpendicularly to the support members, the leg members and support members connected for rotation on the axle to pivot between the loading and stacking positions. The support members and leg members are spaced apart a distance to support tires therebetween such that a row of vertically oriented tires resting on the support members will be formed in a vertical stack on the carriage leg members when the carriage is pivoted to the stacking position. A cylinder with an extensible plunger rod is operably connected between the base frame and a lever arm connected to the axle to selectively pivot the carriage between the loading and stacking position.

9 Claims, 4 Drawing Sheets

TIRE STACKER

TECHNICAL FIELD

The present invention relates generally to apparatus for stacking tires, and more particularly to an improved tire stacker for reorienting a horizontal row of tires to a vertical stack.

BACKGROUND OF THE INVENTION

Tires for vehicles are typically stored in two different ways: (1) arranged in horizontal rows with each tire oriented in a vertical plane, or (2) arranged in vertical stacks with the tires oriented in horizontal planes. While horizontal rows are acceptable for smaller tires, such as those utilized on cars and small trucks, larger tires for large trucks, tractors, and construction vehicles are more efficiently stacked in vertical columns, each tire being oriented in a horizontal plane.

Horizontal rows are much easier for an individual to arrange and work with since the tire may be rolled directly into position. Vertical stacks are more difficult for a single individual to create, since the large tire must be lifted onto the top of the vertical stack. Thus, vertical stacks of tires must typically be created with the use of more than one person, or an individual must use a forklift for each individual tire to be stacked.

SUMMARY OF THE INVENTION

It is a general object of the present invention to provide an improved apparatus for orienting tires into a vertical stack.

Another object is to provide a tire stacker which enables a single individual to create a vertical stack of tires.

A further object of the present invention is to provide a tire stacker which is economical to manufacture and easy to operate.

These and other objects will be apparent to those skilled in the art.

The tire stacking apparatus of the present invention includes a base frame with a carriage pivotally mounted on the frame for selective movement between a horizontal loading position and a vertical stacking position. The carriage includes a pair of parallel support members connected to a rotatable axle, and a pair of legs connected to the axle generally perpendicularly to the support members, the leg members and support members connected for rotation on the axle to pivot between the loading and stacking positions. The support members and leg members are spaced apart a distance to support tires therebetween such that a row vertically oriented tires resting on the support members will be formed in a vertical stack on the carriage leg members when the carriage is pivoted to the stacking position. A cylinder with an extensible plunger rod is operably connected between the base frame a lever arm connected to the axle to selectively pivot the carriage between the loading and stacking position.

DESCRIPTION OF THE PREFERRED EMBODIMENT

Figure 1:
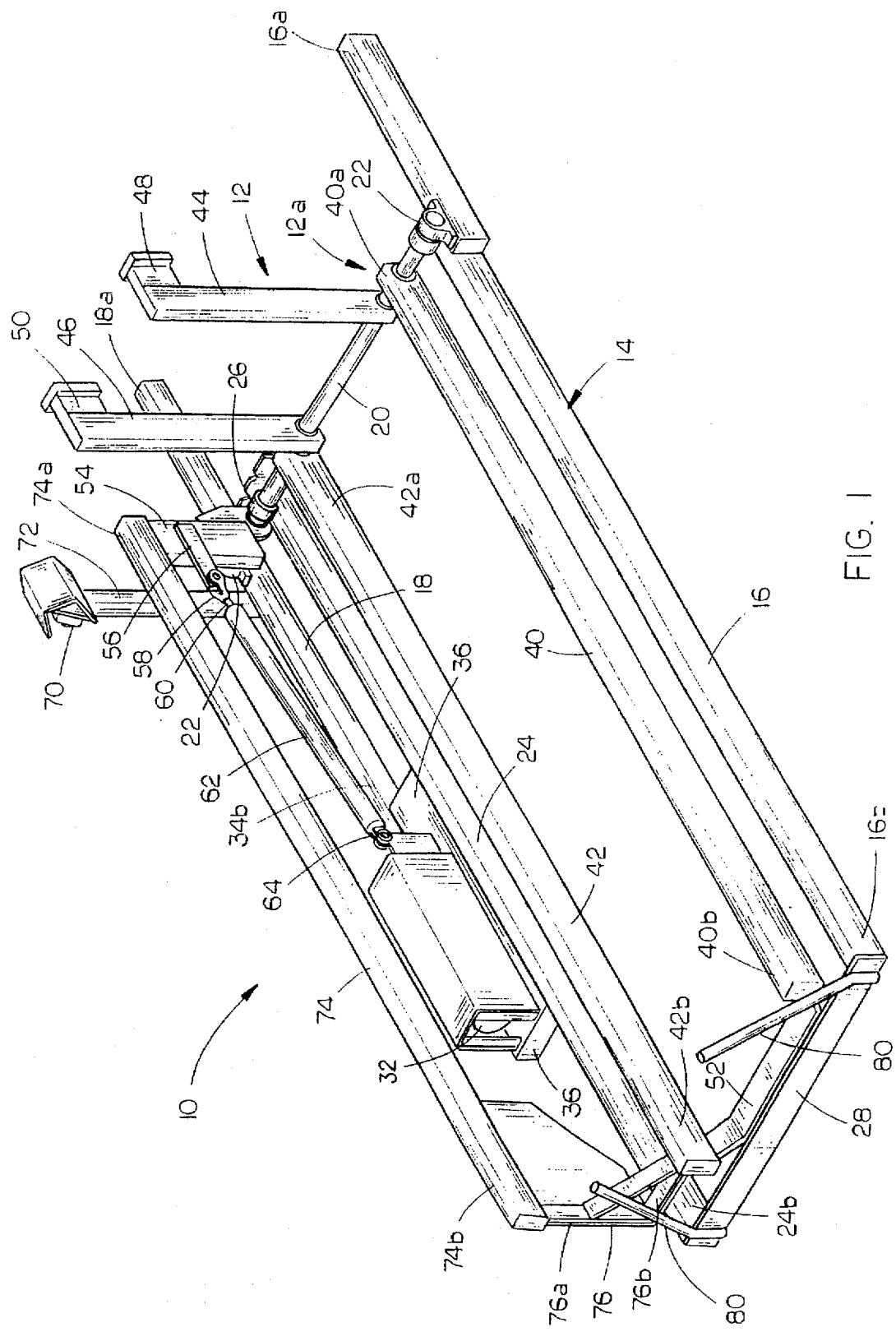
FIG. 1 is a perspective view of the tire stacker of the present invention.

Referring now to the drawings, in which similar or corresponding parts are identified with the same reference numeral and more particularly to FIG. 1, the tire stacker of the present invention is designated generally at 10 and includes a carriage 12 which is pivotally mounted to a base frame 14.

Base frame 14 includes a pair of parallel first and second beams 16 and 18. An axle 20 is rotatably mounted between a pair of pillow bearings 22, the pillow bearings attached to an upper surface of beams 16 and 18 rearwardly of forward ends 16a and 18a, thereof. A third beam 24 has a forward end rotatably connected to axle 20 via a sleeve 26, and extends rearwardly parallel to first and second beams 16 and 18. The rearward ends 16b and 24b of first and third beams 16 and 18 are then connected together in parallel relationship by a transverse beam 28.

A platform 36 is affixed between a rearward end 18b of second beam 18 and an intermediate portion of third beam 24. An hydraulic pump 32 is supported on platform 36, and is utilized to operate the tire stacker 10 as described in more detail hereinbelow.

Carriage 12 is utilized to arrange and support tires, and is mounted at a forward end 12a to axle 20, for pivotal movement therewith. Carriage 12 includes a pair of longitudinal support members 40 and 42 mounted parallel to one another and affixed at a forward end 40a and 42a to axle 20. A pair of legs 44 and 46 have one end mounted to the forward ends 40a and 42a of support members 40 and 42 respectively, and are fixed perpendicularly to support members 40 and 42. The free ends of legs 44 and 46 each have a foot 48 and 50 respectively mounted thereon, to maintain legs 44 and 46 in a horizontal position when carriage 12 is moved to the vertical position shown in FIG. 5.

Figure 3:
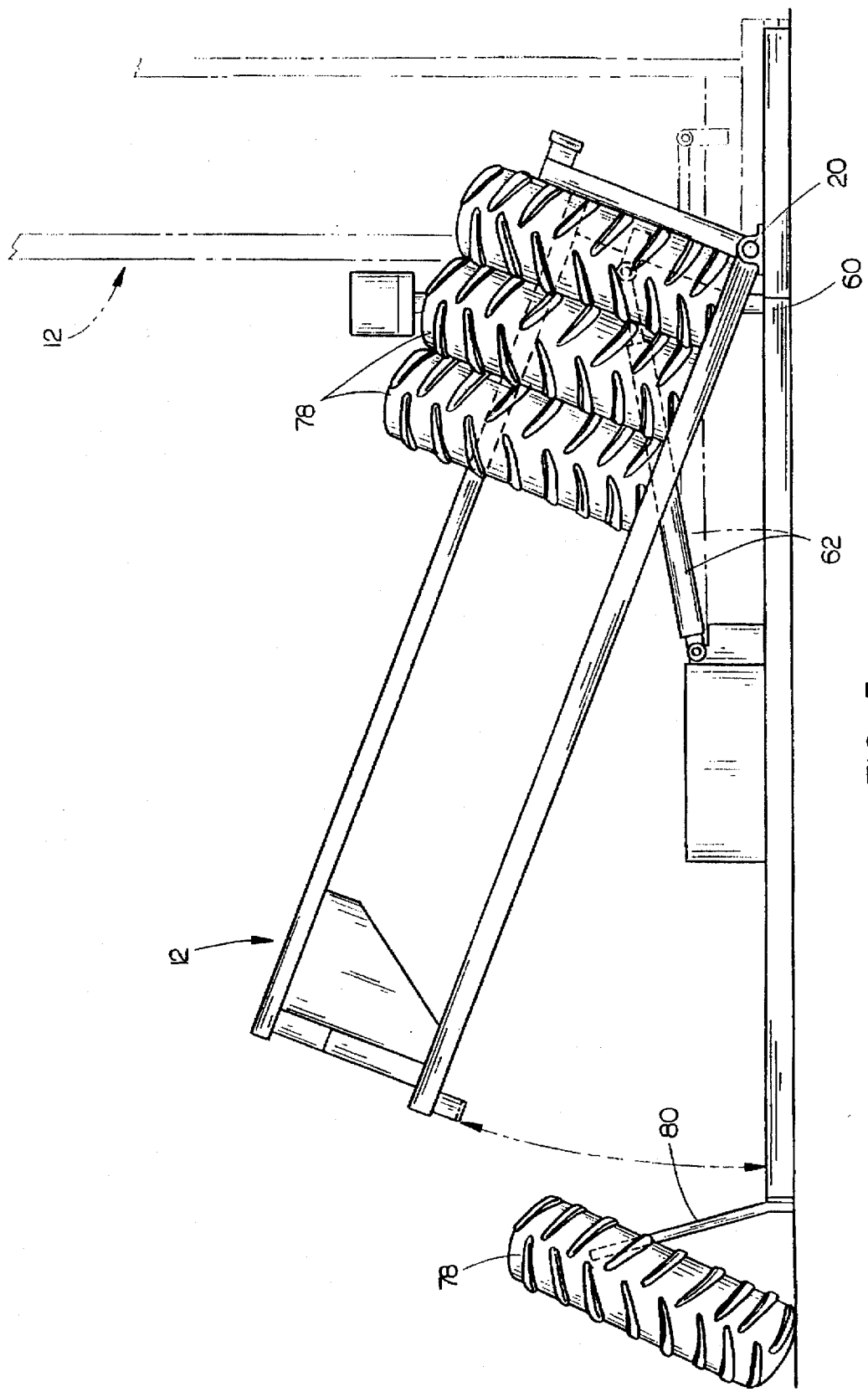
FIG. 3 is a front elevational view of the tire stacker, with the carriage pivoted partially upwardly between the loading position and the upright position.
Figure 4:
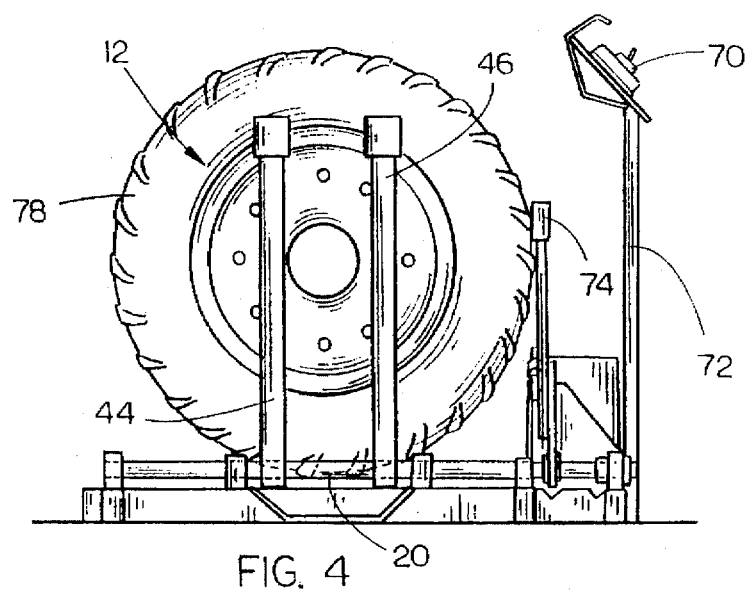
FIG. 4 is an end elevational view taken from the right side of FIG. 2, and showing a tire mounted in the carriage.
Figure 5:
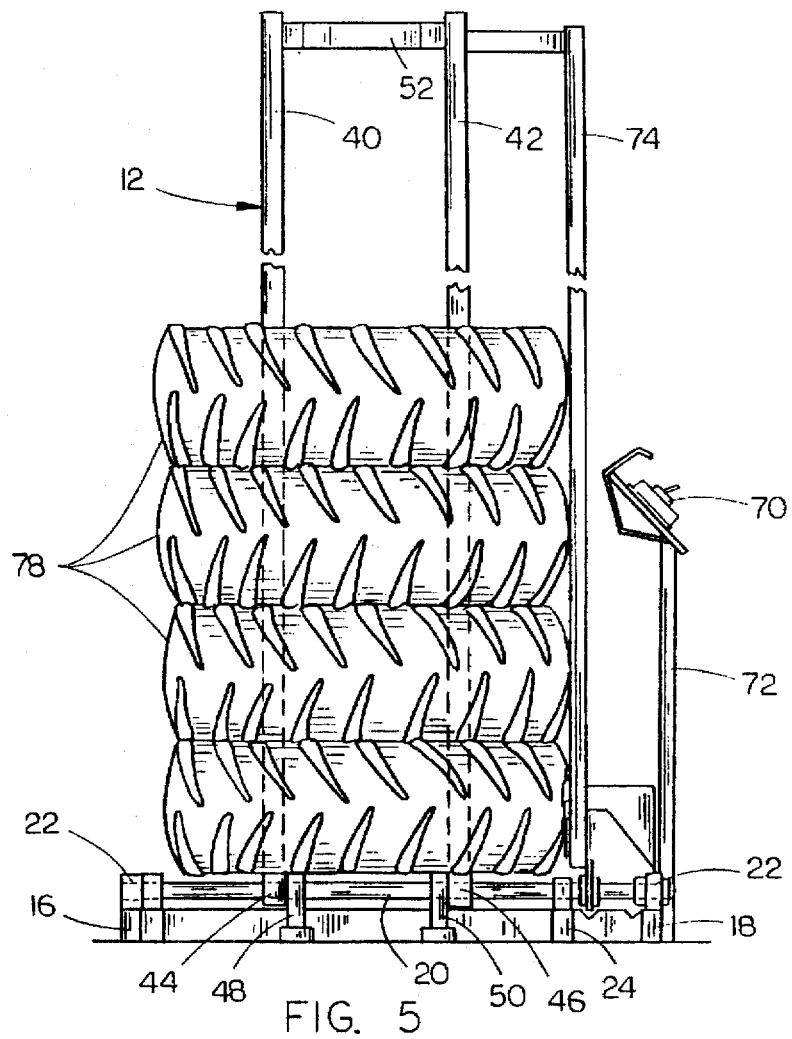
FIG. 5 is an end elevational view similar to FIG. 4, but with the carriage in the upright position.

The rearward ends 40b and 42b of support members 40 and 42 are connected together and maintained in parallel relationship by a generally U-shaped cross member 52. Support members 40 and 42 are spaced apart a distance less than the diameter of the smallest tire which it is desired to support and stack with tire stacker 10. Thus, while tractor tires are shown in FIGS. 3, 4 and 5, smaller tires may also be stacked utilizing tire stacker 10.

Figure 2:
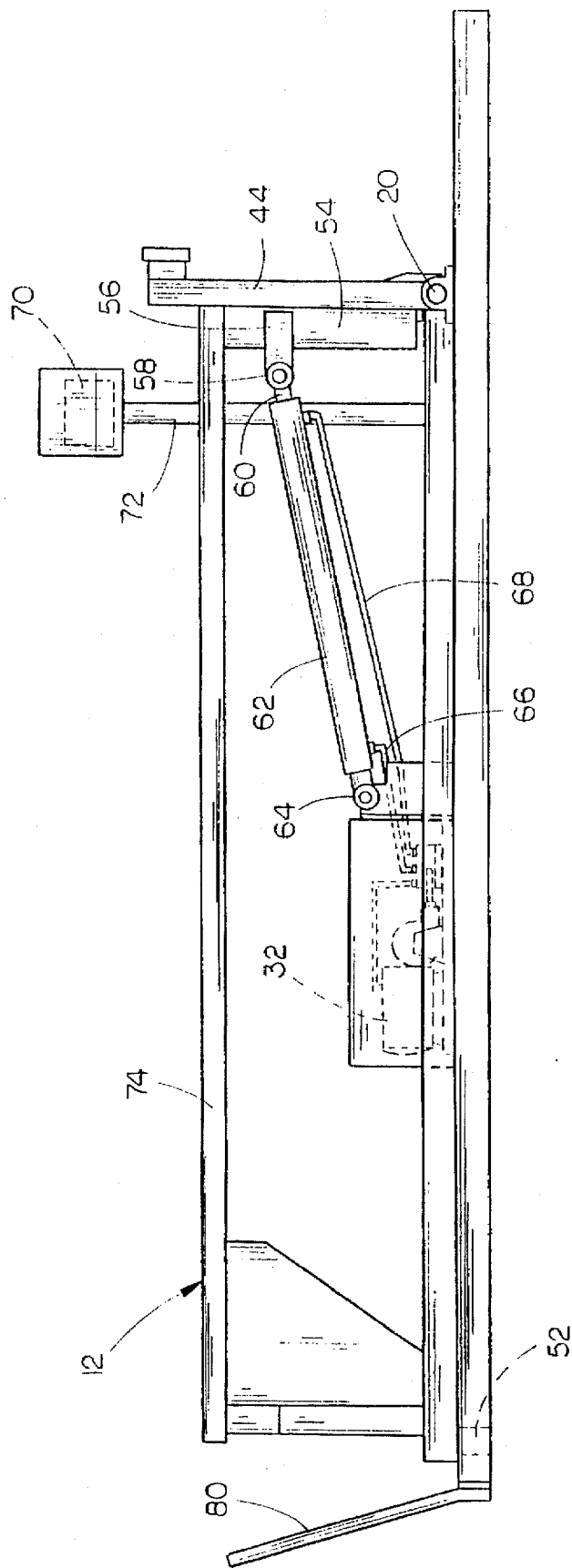
FIG. 2 is a front elevational view of the tire stacker in a lowered position.

Referring now to FIGS. 1 and 2, a lever arm 54 is affixed at its lower end to axle 20 for rotation therewith. Thus, movement of lever arm 54 will cause axle 22 to rotate and thereby pivot carriage 12.

A plate 56 projects rearwardly from the upper end of lever arm 54, and has a clevis 58 pivotally connected thereto. Clevis 58 is affixed to one end of a plunger rod 60 which is operably mounted within a cylinder 62 for selective extension and retraction from the cylinder. The rearward end of cylinder 62 is pivotally mounted by a clevis 64 to platform 36. A pair of hydraulic lines 66 and 68 are connected between the opposing ends of cylinder 62, and pump 32, to selectively extend or retract plunger rod 60 in a conventional fashion. A control switch 70 is mounted on a post 72 and is utilized to actuate pump 32 to raise or lower carriage 12, in a conventional fashion.

A rail 74 is mounted at a forward end 74a to the upper end of lever arm 54, and extends rearwardly parallel to support members 40 and 42. As shown in FIG. 1, rail 74 is spaced horizontally outwardly beyond support member 42 and is spaced vertically above the horizontal plane of support members 40 and 42, to form a stop rail for tires arranged on the support members 40 and 42 (see FIGS. 3–5). An L-shaped bracket 76 depends from the rearward end 74b of rail 74, and includes a vertical back 76a and horizontal leg 76b. As shown in FIG. 1, leg 76b of bracket 76 will contact the upper surface of beam 24 to support rail 74 in a parallel orientation on the upper end of back 76a relative to support member 42. In this way, the lower portion of cross member 52 will contact the floor and support the rearward ends of support members 40 and 42 when the carriage is in the storage position shown in FIG. 1, while leg 76b of bracket 76 will support the rearward end 74b of rail 74 when carriage is in the storage position of FIG. 1.

In operation, carriage 12 is located in the horizontal storage position shown in FIGS. 1, 2 and 4, with carriage legs 44 and 46 oriented in a vertical position. Tires 78 may then be individually rolled up and onto support members 40 and 42 and propped in a vertical orientation against carriage legs 44 and 46. Once the desired number of tires are supported on carriage 12, control switch 70 is activated to so as to actuate the hydraulic pump and extend the plunger rod 60 from cylinder 62. This in turn will pivot lever arm 54, rotating axle 20 and pivoting the entire carriage 12 on axle 20, as shown in FIG. 3. Once carriage 12 has reached the fully upright position, feet 48 and 50 will support carriage legs 44 and 46 in a horizontal position spaced above the ground. Tires 78 are thereby supported in a vertical stack on the spaced apart carriage legs 44 and 46. A forklift or the like may then insert the tines of the fork under tires 78 on the outer sides of carriage legs 44 and 46, to raise the entire stack of tires 78 from carriage 12 so as to move the tires to a desired location.

Referring once again to FIG. 1, a pair of rods 80 are mounted on opposing end of transverse beam 20 and extend upwardly, rearwardly and converge towards one another as shown in FIGS. 1 and 2. Rods 80 are used for supporting large tires 78, as shown in FIG. 3, for work thereon.

Whereas the invention has been shown and described in connection with the preferred embodiment thereof, many modifications, substitutions and additions may be made which are within the intended broad scope of the appended claims.

I claim:

1. A tire stacking apparatus, comprising:

a base frame having forward and rearward ends and opposing longitudinal sides;

a carriage pivotally mounted on the frame for selective movement between a substantially horizontal loading position and a substantially vertical stacking position;

said carriage including a pair of spaced apart parallel tire support members connected at forward ends directly to an axle for pivotal movement on the axle between a generally horizontal position, wherein the carriage is in the loading position, and a generally vertical position, wherein the carriage is in the stacking position;

said carriage including a pair of spaced apart tire support legs directly affixed to the axle for rotation therewith, said legs oriented generally perpendicularly to the support members and mounted to maintain their perpendicular relationship with the support members during movement of the carriage between the loading and stacking positions;

means connected between the frame and carriage for selectively moving the carriage between the loading and stacking positions.

2. The tire stacking apparatus of claim 1, wherein said frame includes a first and second beams connected together and in generally parallel relationship at rearward ends thereof, and wherein said axle is operably mounted between the beams for rotational movement about a longitudinal axis, the axle longitudinal axis being oriented generally perpendicularly to the longitudinal axes of the beams.

3. The tire stacking apparatus of claim 2, wherein said axle is operably mounted intermediate forward and said rearward ends of the beams.

4. The tire stacking apparatus of claim 2, wherein said axle is operably mounted on the beams a predetermined distance above ground, and further comprising a foot mounted on a free end of each of said carriage legs each foot being located and having dimensions so as to support the legs in a horizontal position spaced above ground when the carriage is in the stacking position.

5. The tire stacking apparatus of claim 2, further comprising a third beam having a forward end pivotally connected to said axle between the frame second beam and the carriage, said third beam extending rearwardly parallel to the first and second beams and having a length substantially equal to a length of the first beam measured from the axle to the rearward end of the first beam and a cross member connected between a rearward end of the third beam and the rearward end of the first beam so as to maintain the beams in parallel relationship.

6. The tire stacking apparatus of claim 5, wherein said means for selectively moving the carriage includes a lever arm having one end mounted to the axle and a second end projecting radially therefrom, said lever mounted to rotate the axle about the axle's longitudinal axis.

7. The tire stacking apparatus of claim 6, wherein said means for moving the carriage further includes an operable cylinder with an extensible plunger rod, having one end pivotally connected to the second end of the lever arm, and a second end pivotally connected to the third beam rearwardly of the axle.

8. The tire stacking apparatus of claim 6, further comprising a rail oriented parallel to the beams, spaced outwardly of the third beam and spaced vertically above the beams, said rail connected to the carriage for movement therewith.

9. The tire stacking apparatus of claim 8, wherein the rail has a forward end connected to the second end of the lever arm and a rearward end connected to the rearward end of the third beam.

* * * * *